United States Patent [19]

Todokoro et al.

[11] Patent Number: 5,476,641

[45] Date of Patent: Dec. 19, 1995

[54] METHOD OF SEPARATING AND RECOVERING PLUTONIUM AND NEPTUNIUM FROM PLUTONIUM- AND NEPTUNIUM-CONTAINING NITRIC ACID SOLUTION

[75] Inventors: Akio Todokoro; Yoshiyuki Kihara, both of Naka; Takashi Okada, Katsuta, all of Japan

[73] Assignee: Doryokuro Kakunenryo Kaihatsu Jigyodan, Tokyo, Japan

[21] Appl. No.: 285,514

[22] Filed: Aug. 4, 1994

[30] Foreign Application Priority Data

Aug. 13, 1993 [JP] Japan .................................. 5-201452

[51] Int. Cl.[6] .................................................. C01G 56/00
[52] U.S. Cl. .................................. 423/6; 423/7; 210/682; 976/DIG. 279; 75/344
[58] Field of Search ........................... 210/682; 423/617; 75/344; 976/DIG. 279; 204/1.5

[56] References Cited

U.S. PATENT DOCUMENTS

| | | | |
|---|---|---|---|
| 3,222,124 | 12/1965 | Anderson et al. | 423/6 |
| 3,714,324 | 1/1973 | Weech | 423/6 |
| 4,011,296 | 3/1977 | Ruiz et al. | 423/8 |
| 4,758,313 | 7/1988 | Schmieder et al. | 204/1.5 |
| 4,787,979 | 11/1988 | Kolarik et al. | 210/634 |

OTHER PUBLICATIONS

Tsuboya et al., Proceedings International Solvent Extraction Conference, "Solvent Extraction", vol. 1, Sep. 1974, pp. 1985–1986.
Power Reactor and Nuclear Fuel Development Corporation, "Neptunium Recovery in the Purex Process (II)" Oct. 1971, pp. 1–33.

Primary Examiner—Ngoclan Mai
Attorney, Agent, or Firm—Wenderoth, Lind & Ponack

[57] ABSTRACT

A method of separating and recovering Pu and Np from a Pu- and Np-containing nitric acid solution. The method comprises the steps of subjecting a nitric acid solution containing Pu and Np to valence adjustment by adding a reducing agent consisting of hydroxylamine nitrate and hydrazine to said nitric acid solution so as to reduce Pu and Np in said nitric acid solution to Pu (III) and Np (IV), respectively; adjusting a nitric acid concentration of said nitric acid solution after said valence adjustment to 6 to 8 M; bringing said nitric acid solution after said nitric acid concentration adjustment into contact with a strong basic anion exchange resin so as to cause Np to be selectively adsorbed by said resin and to separate and recover Pu as a plutonium nitrate solution; and eluting said adsorbed Np (IV) by using diluted nitric acid of 1 M or below so as to recover Np as a neptunium nitrate solution. The valence adjustment step may be carried out by subjecting the Pu- and Np-containing nitric acid solution to electrolytic reduction instead of using the reducing agent.

7 Claims, 3 Drawing Sheets

METHOD OF SEPARATING AND RECOVERING PLUTONIUM AND NEPTUNIUM FROM PLUTONIUM- AND NEPTUNIUM-CONTAINING NITRIC ACID SOLUTION

BACKGROUND OF THE INVENTION

This invention relates to a method of efficiently separating and recovering Pu (plutonium) and Np (neptunium) from a nitric acid solution containing Pu and Np.

A method of the present invention can be advantageously utilized when Pu and Np are separated and recovered from a Pu- and Np-containing nitric acid solution generated from, for example, scrap recovery/refining steps, etc, in spent nuclear fuel reprocessing and a nuclear fuel production, and further, when Np is separated and recovered from high level radioactive waste.

Np is an artificial radioactive element that does not exist in nature and is contained together with Pu in spent nuclear fuel as transuranic element produced by neutron irradiation to U (uranium)-238. The transuranic elements other than Pu in spent nuclear fuel in currently-operated light-water reactors are mainly Am (americium) and Np.

The transuranium elements containing Np are processed and disposed of as high level radioactive wastes produced from spent nuclear fuel reprocessing. So-called "formation disposal", i.e., burying them in a deep stratum, has been examined. The problem with this formation disposal is that millions of years are necessary in order to reduce the risk of the transuranic elements to the level of that of natural uranium. Among the transuranium elements, Np is particularly a nuclide having a long lifetime. Therefore, the risk at the time of processing and disposal of high level radioactive wastes can be reduced by separating and removing Np from the high level radioactive wastes.

In reprocessing spent nuclear fuel, U and Pu are recovered, using an extraction solvent such as tributyl phosphate, from a nitric acid solution prepared by dissolving spent nuclear fuel in nitric acid and containing U, Pu, Np, etc. However, separation of Np from Pu and U is difficult because the extraction behavior of Np is analogous to those of U and Pu and furthermore, the valences of Np are four, five and six in nitric acid solution and change complicatedly.

To separate Np from Pu and U by a solvent extraction method, it has been general to add divalent iron (Fe(II)) to the solution to prevent complicated change of valence of Np and to control the valence of Np constant in the solution.

However, when the solvent extraction method described above is used as a method of separating Np, the extraction solvent used deteriorates, so that disposal of the deteriorated waste solvent becomes a new problem. Further, because Fe (II) added as the reducing agent becomes eventually an impurity, a step of removing the Fe impurity is necessary, and the process is complicated.

SUMMARY OF THE INVENTION

An object of the present invention is to provide an improved method of separating Np which does not need any extraction solvent for separating Np, nor Fe reducing agent for valence adjustment of Np in the solution and hence, does not require the step removing impurity.

According to the present invention, there is provided a method of separating and recovering Pu and Np from a Pu- and Np-containing nitric acid solution comprising the steps of: subjecting a nitric acid solution containing Pu and Np to valence adjustment by adding a reducing agent consisting of hydroxylamine nitrate and hydrazine to said nitric acid solution so as to reduce Pu and Np in said nitric acid solution to Pu (III) and Np (IV), respectively; adjusting a nitric acid concentration of said nitric acid solution after said valence adjustment to 6 to 8 M; bringing said nitric acid solution after said nitric acid concentration adjustment into contact with a strong basic anion exchange resin so as to cause Np (IV) to be selectively adsorbed by said resin and to separate and recover Pu as a plutonium nitrate solution; and eluting said adsorbed Np (IV) by using diluted nitric acid of 1 M or below so as to recover Np as a neptunium nitrate solution.

According to the present invention, it is also possible to reduce Pu and Np in the nitric acid solution to Pu (III) and Np (IV), respectively, to effect valence adjustment, by subjecting the Pu- and Np-containing nitric acid solution to electrolytic reduction instead of using the reducing agent of hydroxylamine nitrate and hydrazine described above.

PREFERRED EMBODIMENTS OF THE INVENTION

The method of the present invention will be explained in detail with reference to a flow sheet of a preferred embodiment shown in the accompanying drawings.

Figure 2:
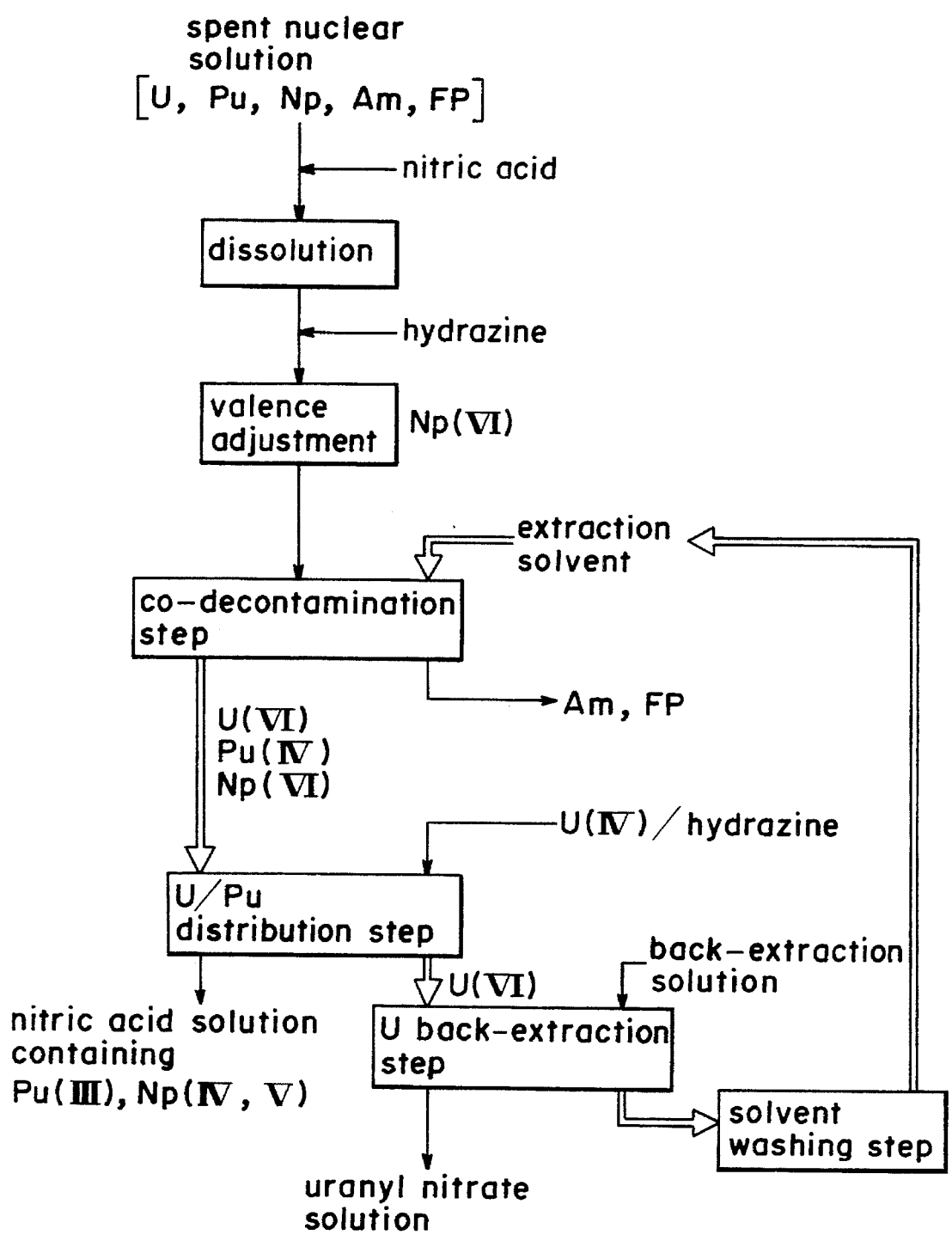
FIG. 2 is a flow sheet of spent nuclear fuel reprocessing as an example of processing for obtaining Pu- and Np-containing nitric acid solution as the objective solution to be treated of the present invention.

A Pu- and Np-containing nitric acid solution, which is obtained, as shown in FIG. 2, in the extraction/recovery process of U and Pu from a nitric acid solution of spent nuclear fuel by a solvent extraction method, can be preferably used as the Pu- and Np-containing nitric acid solution to be processed in the present invention. Namely, the nitric acid solution prepared by dissolving spent nuclear fuel in nitric acid contains Pu, Np, Am (americium), FP (nuclear fission products), etc, and when this solution is brought into contact with an n-dodecane/tributyl phosphate extraction solvent, Np is extracted on the solvent side together with U and Pu, while Am an FP remain in the aqueous phase, producing a high level radioactive waste [co-decontamination step]. In this co-decontamination step, a high extraction efficiency of Np can be obtained when Np exists in the form of VI valence ions. It is therefore preferable to add in advance hydrazine to the nitric acid solution for valence adjustment so as to convert Np to Np (VI). According to the report of Tanaka et al., the higher the concentration of nitric acid and the lower the concentration of nitrous acid, the easier the equilibrium between Np (VI) and Np (V) is shifted towards Np (VI) side, and a greater amount of Np (VI) exists [C. Tanaka, S. Nemoto, T, Tsubota, T. Hoshino: PNCT-841-71-35 (1971) and T. Tsubota, T. Tanaka, S. Nemoto, T. Hoshino: Proc. Int. Solvent Extraction Conf. (ISEC 74), pp. 1985, Lyon (1974)]. Therefore, Np can be extracted with high extraction efficiency together with U and Pu on the solvent side in the co-decontamination step by adding hydrazine acting as an agent for decomposing nitrous acid to a nitric acid solution and increasing the existence amount of Np (VI).

Next, the solvent containing extracted U (VI), Pu (IV) and Np (VI) is brought into contact with an aqueous solution containing uranous (IV) nitrate/hydrazine as a reducing agent, so that Pu (III) and Np (IV, V) are distributed on the aqueous solution side while U (VI) is distributed on the solvent side [U/Pu distribution step]. Uranium (U) extracted on the solvent side is extracted back by a back-extraction solution consisting of diluted nitric acid [U back-extraction step] to obtain a uranyl nitrate solution.

Figure 1:
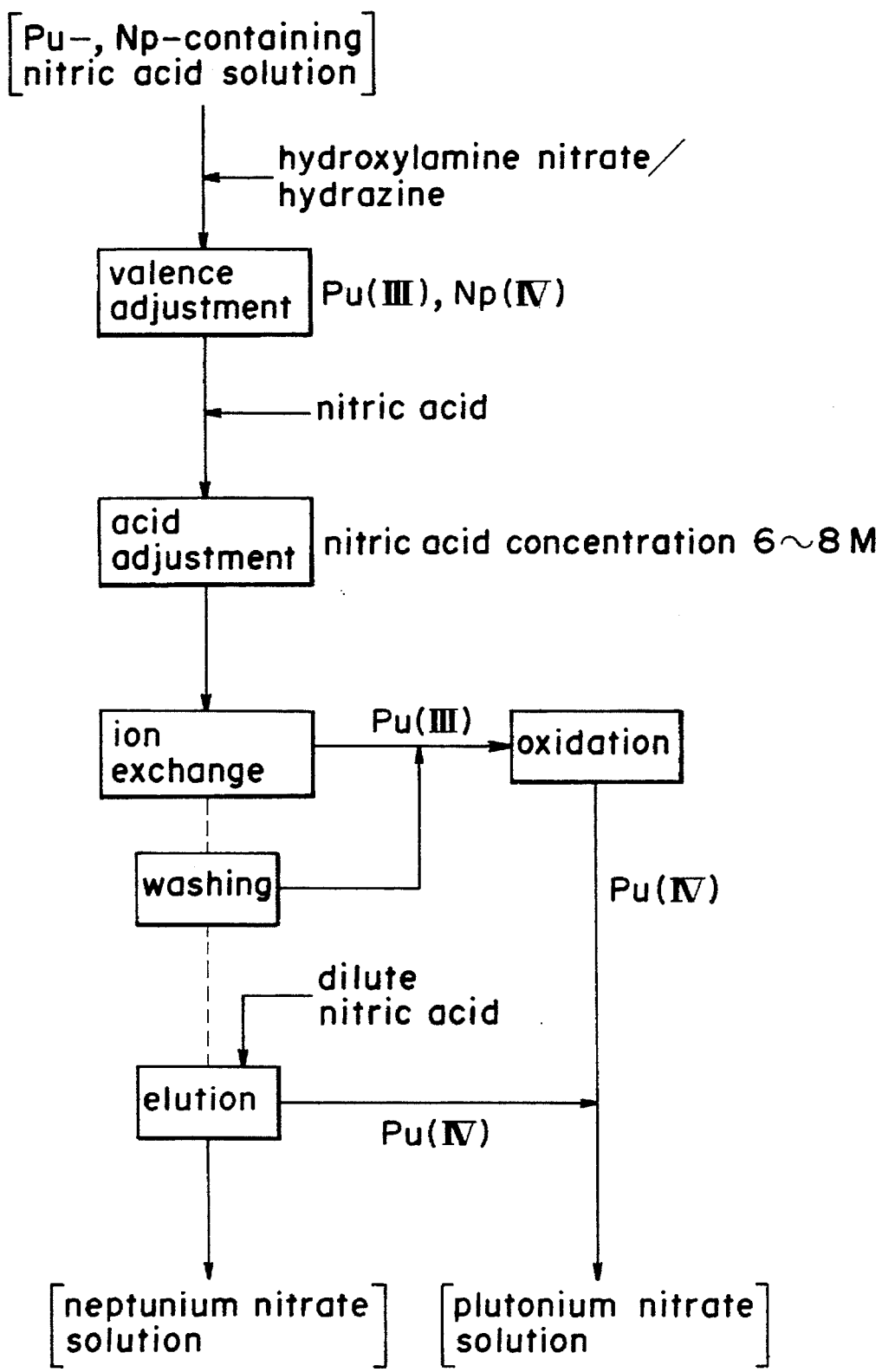
FIG. 1 is a flow sheet showing an embodiment of the present invention.

FIG. 1 is a flow sheet showing a preferred embodiment of the present invention, and a Pu- and Np-containing nitric acid solution obtained by, for example, the U/Pu distribution step of spent nuclear fuel reprocessing as shown in FIG. 2 can be the object to be treated. The fundamental principle of the present invention resides in the processing that Pu and Np are separately recovered from a Pu- and Np-containing nitric acid solution by utilizing the property that a strong basic anion exchange resin selectively adsorbs Np (IV) in the nitric acid system but hardly adsorbs Pu (III).

Generally, Pu exists in the IV valence ions in the nitric acid solution while Np mixes in the form of IV, V and VI valency ions. To separate Pu and Np, therefore, valences of Np and Pu must be adjusted to IV and III, respectively. In the embodiment according to the present invention shown in FIG. 1, this valence adjustment is effected by use of a reducing agent consisting of hydroxylamine nitrate and hydrazine. In the reducing reaction by the hydroxylamine nitrate/hydrazine reducing agent, Pu (IV) is quickly reduced to Pu (III). Though the reducing reaction from Np (VI) to Np (V) proceeds, the reaction from Np (V) to Np (IV) is extremely slow and does not much proceed, in practice. Accordingly, various reducing agents and reducing reactions for obtaining Np (IV) have been examined in the past, and the present invention puts the emphasis on the reducing reaction of Np (V) to Np (IV) by use of the reducing action of Pu (III). In other words, in the present invention, Pu (IV) is first reduced to Pu (III) by hydroxylamine nitrate/hydrazine reducing agent, and the reducing action of Pu (III) promotes the reducing reaction of Np (V) to Np (IV). Pu (III) used for this reducing reaction is oxidized to Pu (IV) but is again reduced to Pu (III) by addition of an excessive amount of the hydroxylamine nitrate/hydrazine reducing agent.

As described above, the reducing agent added at the valence adjustment step of the present invention is used as the reducing agent of Pu (IV) to Pu (III) and is further used as the reducing agent of Np (VI) to Np (V). In this case, hydrazine is used as a decomposing agent of nitrous acid in order to restrict the decomposition of hydroxylamine nitrate by nitrous acid in the nitric acid solution. Nitrous acid must be decomposed by adding hydrazine, too, because nitrous acid has an acition of re-oxidizing Pu (III), which has been adjusted, back to Pu (IV) and because nitrous acid is likely to occur in a solution having a high concentration of nitric acid. For these reasons, excessive amounts, e.g. four times equivalent as much as the object to be reacted, of hydroxylamine nitrate and hydrazine are added, so as to allow the reducing reaction of Pu and Np to quickly and reliably proceed. At the valence adjustment step, the concentration of nitric acid in the nitric acid solution is preferably at most 1 M in order to raise the reaction rate.

Next, nitric acid is added to the nitric acid solution after valences are adjusted to Pu (III) and Np (IV) in the valence adjustment step, so as to adjust the nitric acid concentration to 6 to 8 M. The reason why the nitric acid concentration is adjusted to this range is because Np (IV) is most easily adsorbed by the ion exchange resin within this nitric acid concentration range. The time from the addition of nitric acid to the ion exchange is preferably as short as possible in this acid adjustment step in order to prevent re-oxidation of Pu (III) to Pu (IV), and to this end, the acid adjustment is preferably carried out immediately before the ion exchange.

Contact of the nitric acid solution, which contains Pu (III) and Np (IV) and has been subjected to the acid adjustment, with the strong basic anion exchange resin can be preferably carried out, for example, by causing the nitric acid solution to flow through a column filled with the ion exchange resin. Anion exchange resins which adsorb anion complex of metals and whose affinity with the complex changes with the nitric acid concentration can generally be used as the strong basic anion exchange resin. It is preferable to select an ion exchange resin which has a resistance to nitric acid upon contact with the nitric acid solution and which also has a resistance to the reducing agent because the reducing agent is contained in the nitric acid solution.

When the nitric acid solution containing Pu (III) and Np (IV) is caused to flow through the column of the strong basic anion exchange resin, Np (VI) is adsorbed selectively by the resin and a nitric acid solution containing Pu (III) can be obtained as an effluent. Because this effluent contains the hydroxylamine nitrate/hydrazine reducing agent, the reducing agent is decomposed by adding nitrous acid or by heating. Since Pu (III) is oxidized to Pu (IV) simultaneously with this decomposition treatment of the reducing agent, a plutonium nitrate solution not containing the reducing agent can be finally recovered.

After Pu (III) which is not adsorbed is washed by causing nitric acid of 6 to 8 M to flow through the resin adsorbing Np (IV), an eluent consisting of dilute nitric acid of 1 M or below is caused to flow so as to elute adsorbed Np (IV) from the resin and to recover as neptunium nitrate solution, At this time, a trace amount of Pu (IV), which has been produced by re-oxidation of Pu (III) and adsorbed by the resin, is eluted, too. However, Pu (IV) having a greater distribution coefficient to the resin than that of Np (IV) is eluted more slowly than Np (IV) and consequently, Pu (IV) and Np (IV) can be separately eluted. The reasons why diluted nitric acid of 1M or below is used as the eluent is because Np (IV) is more difficultly adsorbed by the resin in such dilute nitric acid. The washing liquid containing Pu (III) may be mixed and processed with the effluent from the column, and the eluent containing a trace amount of Pu (IV) eluted retardedly may be mixed with the plutonium nitrate solution.

When the resin is washed with nitric acid before the elution of Np (IV) adsorbed by the resin, the reducing agent, too, is washed. Therefore, the reducing agent does not mix into the neptunium nitrate solution obtained by causing the eluate to flow after the washing step.

The neptunium nitrate solution and the plutonium nitrate solution thus separated and recovered can be concentrated whenever necessary.

Figure 3:
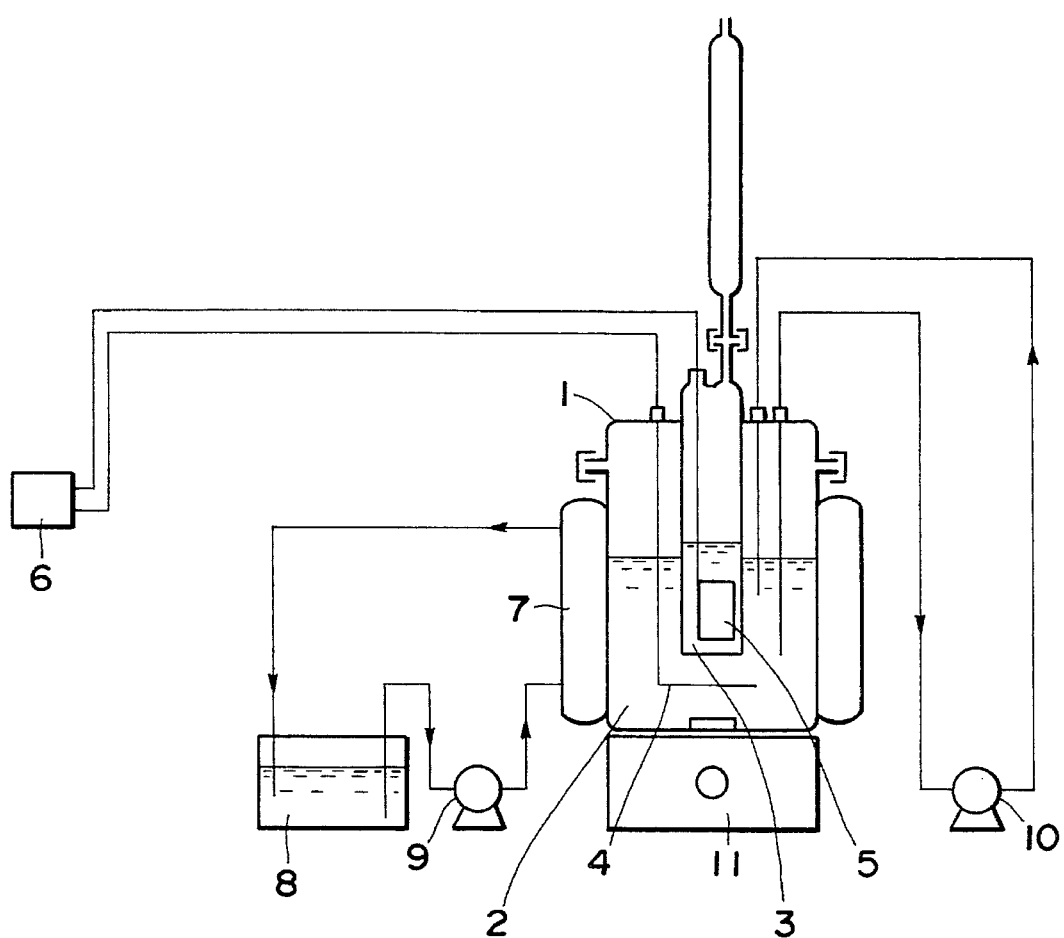
FIG. 3 is an explanatory view showing schematically an example of an electrolytic reduction apparatus that can be used for the valence adjustment in the present invention.

In the embodiment of the present invention shown in FIG. 1, valences of Pu and Np in the nitric acid solution are adjusted by adding the hydroxylamine nitrate/hydrazine reducing agent in the valence adjustment step. However, valence adjustment of Pu (III) and Np(IV) can be made by electrolytically reducing the nitric acid solution without adding the reducing agent. FIG. 3 shows and example of an electrolytic reduction apparatus. A cathode electrolyte 2 prepared by adding hydrazine to Pu- and Np-containing nitric acid solution and an anode electrolyte 3 consisting of nitric acid are contained in an electrolytic bath 1, and both electrodes 4, 5 are connected to a D.C. power supply 6. A jacket 7 is disposed around the outer periphery of the electrolytic bath 1. This bath 1 is kept at a constant temperature by circulating thermostatic water from a thermostatic tank 8 into the jacket 7 by a pump 9. The cathode electrolyte 2 inside the electrolytic bath 1 is stirred by a pump 10 of a circulation system and a stirrer 11. The reason why hydrazine is added to the nitric acid solution of the cathode electrolyte 2 is that re-oxidation of Pu (III) to Pu (IV) by nitrous acid must be prevented. When a current from the D.C. power supply 6 is caused to flow through the cathode 4 and the anode 5 of the electrolytic reduction apparatus, Pu and Np in the nitric acid solution as the cathode electrolyte 2 are reduced to Pu (III) and Np (IV), respectively.

Hereinafter, the present invention will be described in further detail with Example thereof. The symbol "L" in Example represents "liter".

150 mL of a hydroxylamine nitrate/hydrazine reducing agent (270 g/L hydroxylamine nitrate and 90 g/L hydrazine) was added to 125 mL of a plutonium nitrate solution (200 g/L Pu) containing Np corresponding to 1 wt % of Pu, and valence adjustment was carried out by reducing Pu and Np in the nitric acid solution to Pu (III) and Np (IV), respectively. Next, nitric acid was added to the solution so as to adjust the nitric acid concentration in the solution to 6 M, and this nitric acid solution was caused to flow through a column packed with a strong basic anion exchange resin "BIO RAD AG MP-1" (trade name of Nippon Bio Rad Laboratories, K.K.) so as to conduct ion exchange. After 25 g ions in terms of Pu was ion-exchanged, the column was washed with 6 M nitric acid and then elution was effected using 0.5 M diluted nitric acid. As a result, 0.25 g of Np (IV) was first eluted and then, 0.1 g of Pu (IV) was eluted.

The plutonium nitrate solution separated and recovered at this time was heated to 90° to 100° C. so as to decompose the reducing agent contained in the solution and to obtain a plutonium nitrate solution free from mixture of the reducing agent. The reducing agent was not contained in the neptunium nitrate solution eluted and recovered.

As can be understood from the foregoing, the present invention can efficiently separate and recover Pu and Np from a nitric acid solution containing Pu and Np. Particularly because the method of the present invention does not use an extraction solvent, it is free from the problem of use an extraction solvent, it is free from the problem of the production of a waste solvent. The reducing agent used for the valence adjustment can be decomposed and treated unlike an Fe reducing agent that has been used conventionally as the reducing agent. Accordingly, impurities do not mix into the plutonium nitrate solution and neptunium nitrate solution separated and recovered, and a process step for removing impurities is not necessary. Therefore, the process can be simplified and energy saving can be accomplished. When electrolytic reduction is used for the valence adjustment, impurities do not mix into the product because the method does not use the reducing agent, and a process step for removing impurities is not necessary, either.

Since Np is separated and mixture of Np into a high level radioactive waste is prevented by the method of the present invention, the risk involved during processing and disposal of the high level radioactive waste can be reduced.

What is claimed is:

1. A method of separating and recovering Pu and Np from a Pu- and Np-containing nitric acid solution comprising the steps of:

subjecting nitric acid solution containing Pu and Np to valence adjustment by adding a reducing agent consisting of hydroxylamine nitrate and hydrazine to said nitric acid solution so as to reduce Pu and Np in said nitric acid solution to Pu (III) and Np (IV), respectively;

adjusting a nitric acid concentration of said nitric acid solution after said valence adjustment to 6 to 8 M;

bringing said nitric acid solution after said nitric acid concentration adjustment into contact with a strong basic anion exchange resin so as to cause Np (IV) to be selectively adsorbed by said resin and to separate and recover Pu as a plutonium nitrate solution; and eluting said adsorbed Np (IV) by using diluted nitric acid of 1 M or below so as to recover Np as a neptunium nitrate solution.

2. The method according to claim 1, wherein the reducing agent consisting of hydroxylamine nitrate and hydrazine is added to said nitric acid solution in an excessive amount.

3. The method according to claim 1, wherein the concentration of nitric acid in the nitric acid solution at the valence adjustment step is at most 1 M.

4. The method according to claim 1, wherein the step of adjusting the nitric acid concentration of said nitric acid solution is carried out immediately before the step of contacting the nitric acid solution with the ion exchange resin.

5. The method according to claim 1, which further comprises heating the recovered plutonium nitrate solution to decompose the reducing agent contained in said recovered plutonium nitrate solution.

6. The method according to claim 1, which further comprises adding nitrous acid to the recovered plutonium nitrate solution to decompose the reducing agent contained in said recovered plutonium nitrate solution.

7. A method of separating and recovering Pu and Np from a Pu- and Np-containing nitric acid solution comprising the steps of:

subjecting a nitric acid solution containing Pu and Np to valence adjustment by electrolytically reducing said solution so as to reduce Pu and Np in said nitric acid solution to Pu (III) and Np (IV), respectively;

adjusting a nitric acid concentration of said nitric acid solution after said valence adjustment to 6 to 8 M;

bringing said nitric acid solution after said nitric acid concentration adjustment into contact with a strong basic anion exchange resin so as to cause Np (IV) to be selectively adsorbed by said resin and to separate and recover Pu as a plutonium nitrate solution; and eluting said adsorbed Np (IV) by using diluted nitric acid of 1 M or below so as to recover Np as a neptunium nitrate solution.

* * * * *